United States Patent
Steinmetz et al.

(10) Patent No.: US 10,221,324 B2
(45) Date of Patent: Mar. 5, 2019

(54) USE OF PHOSPHORIC ESTERS IN AQUEOUS BASECOATS

(71) Applicant: BASF Coatings GmbH, Muenster (DE)

(72) Inventors: Bernhard Steinmetz, Ruetschenhausen (DE); Peggy Jankowski, Guentersleben (DE); Nadia Luhmann, Karlstadt-Stetten (DE); Michael Matura, Kitzingen (DE); Michael Wohlfarth, Gelchsheim (DE)

(73) Assignee: BASF Coatings GmbH, Muenster (DE)

( * ) Notice: Subject to any disclaimer, the term of this patent is extended or adjusted under 35 U.S.C. 154(b) by 20 days.

(21) Appl. No.: 15/548,799

(22) PCT Filed: Jan. 20, 2016

(86) PCT No.: PCT/EP2016/051111
§ 371 (c)(1),
(2) Date: Aug. 4, 2017

(87) PCT Pub. No.: WO2016/124400
PCT Pub. Date: Aug. 11, 2016

(65) Prior Publication Data
US 2018/0022944 A1    Jan. 25, 2018

(30) Foreign Application Priority Data
Feb. 5, 2015    (EP) .................... 15153945

(51) Int. Cl.
| | |
|---|---|
| C09D 7/63 | (2018.01) |
| C09D 7/61 | (2018.01) |
| C08K 3/38 | (2006.01) |
| C08K 5/52 | (2006.01) |
| C08K 5/55 | (2006.01) |
| C09D 5/00 | (2006.01) |
| C08K 3/32 | (2006.01) |
| C08K 5/521 | (2006.01) |

(52) U.S. Cl.
CPC .............. *C09D 7/63* (2018.01); *C09D 5/002* (2013.01); *C09D 7/61* (2018.01); *C08K 5/52* (2013.01); *C08K 5/521* (2013.01); *C08K 2003/329* (2013.01); *C08K 2201/019* (2013.01)

(58) Field of Classification Search
CPC .............. C08K 3/38; C08K 5/55; C08K 5/52
See application file for complete search history.

(56) References Cited

U.S. PATENT DOCUMENTS

| | | | | |
|---|---|---|---|---|
| 6,592,998 | B2 * | 7/2003 | Anderson | B05D 7/57 428/447 |
| 8,906,507 | B2 * | 12/2014 | Campbell | B05D 7/576 428/423.1 |
| 2003/0072943 | A1 | 4/2003 | Anderson et al. | |

FOREIGN PATENT DOCUMENTS

| | | |
|---|---|---|
| DE | 40 09 858 A1 | 10/1991 |
| DE | 44 37 535 A1 | 4/1996 |
| DE | 199 48 004 A1 | 7/2001 |
| DE | 199 48 004 B4 | 5/2006 |
| JP | 2005-162929 A | 6/2005 |
| JP | 2005-162930 A | 6/2005 |
| WO | 91/15528 A1 | 10/1991 |
| WO | 03/011986 A1 | 2/2003 |
| WO | WO 2014/033135 A2 | 3/2014 |

OTHER PUBLICATIONS

International Search Report and Written Opinion dated Mar. 9, 2016 in PCT/EP2016/051111 (with English translation of Written Opinion and English translation of categories of cited documents).
International Search Report dated Mar. 9, 2016 in PCT/EP2016/051111 filed Jan. 20, 2016.

* cited by examiner

*Primary Examiner* — Vu A Nguyen
(74) *Attorney, Agent, or Firm* — Oblon, McClelland, Maier & Neustadt, L.L.P.

(57) ABSTRACT

The invention relates to the use of phosphoric acid and/or of monoesters and/or diesters of phosphoric acid in aqueous basecoat materials for improving adhesion of these coating materials to overbaked clearcoat materials which comprise boron compounds.

7 Claims, No Drawings

USE OF PHOSPHORIC ESTERS IN AQUEOUS BASECOATS

The present invention relates to the use of phosphoric acid and/or of monoesters and/or diesters of phosphoric acid in aqueous basecoat materials for the purpose of improving the intercoat adhesion.

Basecoat materials are intermediate coating materials that provide color and/or effect and are customary in automobile finishing and industrial coating. The basecoat film is covered by an overlying clearcoat film, which protects the basecoat system from effects of weathering and from mechanical and chemical attack. The basecoat material and the clearcoat material are typically applied wet-on-wet and are cured jointly by baking.

Whereas formerly in automobile finishing a surfacer was applied first of all, before the basecoat material, to the vehicle body coated with an electrocoat material, more recent painting plants have often omitted any surfacer. In this case, instead, two basecoat films are applied. This process is termed an "Integrated Paint Process" (IPP).

A substantial quality criterion in paint finishes is the adhesion of the cured coating compositions to the coated substrate. In the case of multicoat paint systems, of the kind customary, for example, in automobile finishing, great importance further attaches to the adhesion between the individual coats of paint, referred to as intercoat adhesion.

Automobile finishes are subject to severe mechanical stress as a result of projectile stones. Accordingly there is a requirement for a high level of stonechip resistance. If the adhesion of the lowermost coat of paint to the vehicle body is deficient, delamination may occur to the entire multicoat paint system. If intercoat adhesion is deficient, sections of one or more coats may delaminate under stonechip exposure, without the substrate being laid fully bare.

Patent application WO 03/011986 A1 discloses the addition of boric acid or other boron compounds as adhesion promoters to the coating materials used in producing a multicoat paint system, for the purpose of improving the intercoat adhesion. In such a system, the clearcoat material used for producing the topmost coat may also comprise the boron compounds.

In the industrial finishing of automobiles, for example, the coated workpieces pass through an oven drying unit, in which the applied coating materials are cured by input of thermal energy. With the metallic finishes that are nowadays widespread, for example, the metallic basecoat material and the concluding clearcoat material are applied wet-on-wet and are jointly cured.

In the context of oven drying, the parameters of baking time and baking temperature influence one another inversely—that is, at a higher temperature, there is a reduction in the baking time, and for a longer baking time, a lower temperature is needed in order to obtain ideal curing of the paint system. As a result of disruptions in the drying unit, caused by the transport apparatus coming to a standstill, for example, it may be the case that the workpieces spend too long in the oven drying unit in view of the prevailing temperature. In that case the phenomenon known as overbaking may occur. Overbaking is understood as the baking of a coating material with an energy input higher than is necessary for complete crosslinking. This may be caused by exceedance of the baking time and/or of the baking temperature. On overbaking, existing crosslinks between the molecules may be broken down again, with the consequent formation of cleavage products. It is also possible for greater crosslinking than desired to occur during overbaking. The requisite resistance properties of the finish are generally not achieved. Effects of overbaking include embrittlement or yellowing of the paint film (Römpp Lexikon Lacke and Druckfarben, Georg Thieme Verlag, 10th edition, 1998, p. 585).

It may be assumed that overbaking occurs if the baking time mandated for a paint is exceeded by 20% or more, and/or if the mandated baking temperature is exceeded by 5° C., more particularly 10° C., or more.

In some cases the workpieces have to be repainted, owing to painting defects typical of the finishing operation, such as dirt, pinholes, or craters, for example. An occasional occurrence is that overbaked workpieces as well must be repainted.

It has now been found that both within the manufacturer plant and in refinish workshops, when a basecoat material and a clearcoat material are applied to an existing cured clearcoat material, the intercoat adhesion is extraordinarily poor if the already cured clearcoat material comprises boron compounds and is overbaked.

It is an object of the present invention to improve the intercoat adhesion on an already cured, overbaked clearcoat material comprising boron compounds when a further basecoat material is applied.

Surprisingly it has been found that this object can be achieved through the addition to the basecoat material of phosphoric acid and/or phosphoric esters.

The present invention accordingly provides the use of phosphoric acid and/or of monoesters and/or diesters of phosphoric acid in aqueous basecoat materials for improving the adhesion of these coating materials on overbaked clearcoat materials which comprise boron compounds.

The adhesion-promoting effect of phosphoric esters is known in itself. In view of the large number of known adhesion promoters, however, it could not have been predicted that phosphoric esters in particular would improve the adhesion of refinish basecoats to overbaked clearcoats comprising boron compounds.

The basecoat materials advantageously contain 0.1 to 5 wt % of phosphoric acid and/or phosphoric ester, based on the uncured coating material. Amounts of less than 0.1 wt % do not give a sufficient effect. If the amount of phosphoric acid and/or phosphoric ester is higher than 5 wt %, defects may occur in the paint film.

With particular advantage the amount of phosphoric acid and/or phosphoric ester is 0.3 to 1.5 wt %.

The phosphoric esters advantageously have the general formula I

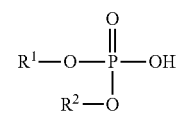

in which $R^1$ and $R^2$ are identical to or different from one another and are selected from the group consisting of substituted and unsubstituted alkyl having 1 to 20 carbon atoms, cycloalkyl having 3 to 20 carbon atoms, and aryl having 6 to 20 carbon atoms, substituted and unsubstituted alkylaryl, arylalkyl, alkylcycloalkyl, cycloalkylalkyl, arylcycloalkyl, cycloalkylaryl, alkylcycloalkylaryl, alkylarylcycloalkyl, arylcycloalkylalkyl, arylalkylcycloalkyl, cycloalkylalkylaryl, and cycloalkylarylalkyl, the alkyl, cycloalkyl, and aryl groups present therein containing in each case the above-stated number of carbon atoms, and $R^1$ or $R^2$ being hydrogen in the case of the monoesters.

With particular advantage the phosphoric ester is monophenyl or diphenyl phosphate or monobutyl or dibutyl phosphate, or a mixture of two or more of the stated phosphoric esters.

Advantageously the basecoat materials are free from effect pigments, more particularly aluminum effect pigments.

Aside from the presence of phosphoric acid and/or esters in the basecoat materials, the basecoat and clearcoat materials which can be used in accordance with the invention have no peculiarities. The customary aqueous basecoat materials and the customary clearcoat materials can be used.

The invention is illustrated in more detail below by working examples.

A) Preparation of a Copolymer (CP) and of an Aqueous Dispersion Comprising this Polymer A dispersion of an alpha-methylstyryl-containing polyurethane was prepared in a method based on patent specification DE 19948004 B4, page 27, example 1, "Preparation of an inventive polyurethane (B)", with the additional use of trimethylolpropane and with the solids content of the resulting dispersion being only 29 rather than 35.1 wt %. In analogy to the adduct (B2) mentioned in patent specification DE 19948004 B4, preparation example 1, an adduct was prepared with monoethanolamine rather than with diethanolamine:

For this preparation, to start with, a reaction vessel, equipped with stirrer, internal thermometer, reflux condenser, and electrical heating, was charged under nitrogen with 200.0 parts by weight of methyl ethyl ketone, 800.0 parts by weight of N-methylpyrrolidone, and 221.3 parts by weight of monoethanolamine (BASF SE) at 20° C. Added dropwise to this mixture over one and a half hours were 778.7 parts by weight of 1-(1-isocyanato-1-methylethyl)-3-(1-methylethenyl)benzene (TMI® (META) Unsaturated Aliphatic Isocyanate, Cytec) having an isocyanate content of 20.4 wt % isocyanate, the addition taking place in such a way that the reaction temperature did not exceed 40° C. The resulting reaction mixture was stirred until free isocyanate groups were no longer detectable. Thereafter the reaction mixture was stabilized with 200 ppm of hydroquinone.

The theoretical solids content of the thus-prepared solution of the adduct described was 50 wt %.

Next, in a further reaction vessel equipped with stirrer, internal thermometer, reflux condenser, and electrical heating, 431.7 parts by weight of a linear polyester polyol and 69.7 parts by weight of dimethylolpropionic acid (GEO Speciality Chemicals) were dissolved under nitrogen in 355.8 parts by weight of methyl ethyl ketone and 61.6 parts by weight of N-methylpyrrolidone. The linear polyester polyol had been prepared beforehand from dimerized fatty acid (Pripol® 1012, Uniqema), isophthalic acid (BP Chemicals), and hexane-1,6-diol (BASF SE) (weight ratio of the dimeric fatty acid to isophthalic acid to hexane-1,6-diol starting materials=54.00:30.02:15.98) and it had a hydroxyl number of 73 mg KOH/g solids content and a number-average molar mass of 1379 g/mol. Added to the resulting solution at 45° C. were 288.6 parts by weight of isophorone diisocyanate (Basonat® I, BASF SE) having an isocyanate content of 37.75 wt %. When the exothermic reaction had subsided, the reaction mixture was heated slowly to 80° C. with stirring. It was stirred further at this temperature until the isocyanate content of the solution was 3.2 wt % and was constant. Thereafter the reaction mixture was cooled to 65° C. and 85.2 parts by weight of the above-described adduct together with 21.8 parts by weight of trimethylolpropane (BASF SE) were added. The resulting reaction mixture was stirred at 65° C. until the isocyanate content of the solution had dropped to 1.0 wt %. At this stage 22.2 wt % of diethanolamine (BASF SE) were added and the amount of isocyanate groups was monitored until free isocyanate groups were no longer detectable. The resulting, dissolved polyurethane was admixed with 139.7 parts by weight of methoxypropanol and 43.3 parts by weight of triethylamine (BASF SE). 30 minutes after the addition of amine, the temperature of the solution was lowered to 60° C., after which 1981 parts by weight of deionized water were added with stirring over 30 minutes. The methyl ethyl ketone was distilled off from the resulting dispersion under reduced pressure at 60° C. After that any losses of water and of solvent were compensated.

The resulting dispersion of an alpha-methylstyryl-containing polyurethane had a solids content of 29.0 wt %, the acid number was 34.0 mg KOH/g solids content, and the pH was 7.0 (measured at 23° C.).

Examples of Paint Formulations

1. Preparation of a Noninventive Waterborne Basecoat Material 1

The components listed in table A were stirred together in the order stated to form an aqueous mixture. This mixture was then stirred for 10 minutes and adjusted using deionized water and dimethylethanolamine to a pH of 8 and to a spray viscosity of 125 mPas under a shearing load of 1000 $s^{-1}$, measured using a rotational viscometer (Rheomat RM 180 instrument from Mettler-Toledo) at 23° C.

TABLE A

Waterborne basecoat material 1 (= DE02-2013-768-1, but without Texanol (replaced by 2-EH) and EFKA 3772)

| Component | Parts by weight |
| --- | --- |
| Copolymer prepared by the method described under A) | 1.13 |
| Aqueous Tafigel ® AP10 solution; rheological agent available from Münzing Chemie | 0.3 |
| Deionized water | 21.75 |
| TMDD (BASF SE) | 0.42 |
| White paste (see white paste preparation below) | 45.4 |
| Adhesion polyester analogous to EP 12182050, page 28, line 13 to line 33 | 6.6 |
| Melamine-formaldehyde resin (Luwipal ® 052 from BASF SE) | 6.8 |
| 50 wt % strength solution of Rheovis ® PU 1250 (BASF SE); rheological agent | 0.3 |
| Yellow paste | 6.1 |
| Carbon black paste | 3.9 |
| Red paste | 0.5 |
| Tributoxyethyl phosphate | 1.6 |
| 2-Ethylhexanol | 1.3 |
| Acronal ® 290D from BASF SE | 3.9 |

Preparation of the Yellow Paste:

The yellow paste was prepared from 49.5 parts by weight of an acrylated polyurethane dispersion, itself prepared according to international patent application WO 91/15528 Binder dispersion A, and from 37 parts by weight of Bayferrox® 3910 and 13.5 parts by weight of deionized water.

Preparation of the Carbon Black Paste:

The carbon black paste was prepared from 25 parts by weight of an acrylated polyurethane dispersion, itself prepared according to international patent application WO 91/15528 Binder dispersion A, 10 parts by weight of carbon black, 0.1 part by weight of methyl isobutyl ketone, 1.36 parts by weight of dimethylethanolamine (10% strength in DI water), 2 parts by weight of a commercial polyether (Pluriol® P900 from BASF SE) and 61.45 parts by weight of deionized water.

Preparation of the Red Paste:

The red paste was prepared from 40 parts by weight of an acrylated polyurethane dispersion, itself prepared according to international patent application WO 91/15528 Binder dispersion A, 34.5 parts by weight of Cinilex® DPP Red, 2 parts by weight of a commercial polyether (Pluriol® P900 from BASF SE), 2 parts by weight of 1-propoxy-2-propanol, and 20.5 parts by weight of deionized water.

Preparation of the White Paste:

The white paste was prepared analogously to PAT 75688 from 43 parts by weight of Titan rutile 2310, 39 parts by weight of the copolymer (prepared by the method described under A)), 5 parts by weight of butyl glycol, and 13 parts by weight of deionized water.

2. Preparation of an Inventive Waterborne Basecoat Material E1

The waterborne basecoat material E1 was prepared analogously to table A, but with the further addition of 6.5 parts by weight of a mixture of 13 parts by weight of Duraphos® BAP (Solvay) and 87 parts by weight of a 10% strength solution of dimethylethanolamine in deionized water.

3. Preparation of an Inventive Waterborne Basecoat Material E2

The waterborne basecoat material E2 was prepared analogously to table A, but with the further addition of 1.58 parts by weight of Baysolvex® D2EHPA (Lanxess), which had been neutralized beforehand with 10% strength dimethylethanolamine in deionized water.

4. Preparation of an Inventive Waterborne Basecoat Material E3

The waterborne basecoat material E3 was prepared analogously to table A, but with the further addition of 6.9 parts by weight of a mixture of 75 parts by weight of Phenyl Acid Phosphate® (IlseChem, LLC) and 337.5 parts by weight of a 10% strength solution of dimethylethanolamine in deionized water.

5. Preparation of an Inventive Waterborne Basecoat Material E4

The waterborne basecoat material E4 was prepared analogously to table A, but with the further addition of 0.298 part by weight of a mixture of 6.3 parts by weight of phosphoric acid (Brenntag) and 93.7 parts by weight of a 10% strength solution of dimethylethanolamine in deionized water.

6. Preparation of a Noninventive Waterborne Basecoat Material 2

The components listed under "aqueous phase" in table B were stirred together in the order stated to form an aqueous mixture. In the next step, an organic mixture was prepared from the components listed under "organic phase". The organic mixture was added to the aqueous mixture. The resulting mixture was then stirred for 10 minutes and adjusted using deionized water and dimethylethanolamine to a pH of 8 and a spray viscosity of 58 mPas under a shearing load of 1000 s$^{-1}$, measured using a rotational viscometer (Rheomat RM 180 instrument from Mettler-Toledo) at 23° C.

TABLE B

Waterborne basecoat material 2 (analogous to DE02-2013-523-2)

| Component | Parts by weight |
|---|---|
| Aqueous phase | |
| 3% strength Na Mg phyllosilicate solution | 29.1 |
| Deionized water | 10.5 |
| Butyl glycol | 4.1 |
| Polyurethane-modified polyacrylate; prepared according to page 7, line 55 to page 8, line 23 of DE 4437535 A1 | 2.8 |
| 50 wt % strength solution of Rheovis® PU 1250 (BASF SE); rheological agent | 0.2 |
| Polyester; prepared according to example D, column 16, lines 37-59 of DE-A-4009858 | 5.5 |
| TMDD (BASF SE) | 1.4 |
| Melamine-formaldehyde resin (Luwipal® 052 from BASF SE) | 2.9 |
| 10% strength dimethylethanolamine in water | 0.4 |
| Polyurethane-based graft copolymer; prepared analogously to DE 19948004 - A1 (page 27 - example 2) | 24.1 |
| Isopropanol | 1.6 |
| Isopar® L from Exxon Mobil | 2 |
| Byk-347® from Altana | 0.6 |
| Pluriol® P 900 from BASF SE | 0.4 |
| Tinuvin® 384-2 from BASF SE | 0.7 |
| Tinuvin 123 from BASF SE | 0.4 |
| Carbon black paste | 0.4 |
| Blue paste | 1.5 |
| Organic phase | |
| Aluminum pigment 1, available from Altana-Eckart | 1.8 |
| Aluminum pigment 2, available from Altana-Eckart | 2 |
| Butyl glycol | 3.8 |
| Polyurethane-based graft copolymer; prepared analogously to DE 19948004 - A1 (page 27 - example 2) | 3.8 |

Preparation of the Blue Paste:

The blue paste was prepared from 69.8 parts by weight of an acrylated polyurethane dispersion, itself prepared according to international patent application WO 91/15528 Binder dispersion A, 12.5 parts by weight of Paliogen® Blue L 6482, 1.5 parts by weight of dimethylethanolamine (10% strength in DI water), 1.2 parts by weight of a commercial polyether (Pluriol® P900 from BASF SE) and 15 parts by weight of deionized water.

Preparation of the Carbon Black Paste:

The carbon black paste was prepared from 25 parts by weight of an acrylated polyurethane dispersion, itself prepared according to international patent application WO 91/15528 Binder dispersion A, 10 parts by weight of carbon black, 0.1 part by weight of methyl isobutyl ketone, 1.36 parts by weight of dimethylethanolamine (10% strength in DI water), 2 parts by weight of a commercial polyether (Pluriol® P900 from BASF SE) and 61.45 parts by weight of deionized water.

Comparison Between Waterborne Basecoat Materials 1 and E1-E4

For the determination of the stonechip resistance, the multicoat paint systems were produced according to the following general protocol. The process corresponds to the Integrated Paint Process (IPP).

A steel panel coated with a cathodic electrocoat and with dimensions of 10×20 cm was the substrate used.

Applied atop this panel first of all was the waterborne basecoat material 1 or E1-E4. After 4-minute flashing of the basecoat at room temperature, in each case waterborne basecoat material 2 was applied, followed by flashing for 4 minutes at room temperature and then by interim drying in a forced air oven at 70° C. for 10 minutes. Applied atop the dried waterborne basecoat film was the boron-containing two-component clearcoat material CeramiClear® from PPG. The resulting clearcoat film was flashed at room temperature for 20 minutes. Thereafter the waterborne basecoat film and the clearcoat film were cured in a forced air oven at 150° C. for 68 minutes, in order to produce overbaking. The mandated baking time is 20 minutes and the mandated baking temperature is 140° C. for the CeramiClear® clearcoat material. The waterborne basecoat material 1 or E1-E4 was then applied to the above-described original finish. After 4-minute flashing of the basecoat at room temperature, in each case the waterborne basecoat material 2 was applied, followed by 4-minute flashing at room temperature and then by interim drying in a forced air oven at 70° C. for 10 minutes. Applied atop the dried waterborne basecoat film was the two-component clearcoat material CeramiClear® from PPG. The resulting clearcoat film was flashed at room temperature for 20 minutes. The waterborne basecoat film and the clearcoat film were subsequently cured in a forced air oven at 140° C. for 20 minutes.

The multicoat paint systems obtained accordingly were investigated for cross-cut adhesion. For this purpose the cross-cut was carried out according to DIN EN ISO 2409:2013-6. The results of the cross-cut test were assessed according to DIN EN ISO 2409:2013-6.

The results are given in table 1.

TABLE 1

Cross-cut resistance of the total systems formed from waterborne basecoat material 1 or E1-E4 and waterborne basecoat material 2

| WBM system | Cross-cut result | Assessment |
|---|---|---|
| 1 & 2 | 5 | unsatisfactory |
| E1 & 2 | 0 | satisfactory |
| E2 & 2 | 0 | satisfactory |
| E3 & 2 | 0 | satisfactory |
| E4 & 2 | 0 | satisfactory |

The results show that the inventive use of the phosphoric acid and/or monoesters and diesters of phosphoric acid significantly enhances the cross-cut resistance in comparison to the waterborne basecoat materials 1.

List of Raw Materials Used:
Tafigel® AP10 Modified acrylic polymer (thickener) (Münzing Chemie GmbH)
TMDD 2,4,7,9-Tetramethyl-5-decyne-4,7-diol
Luwipal® 052 Etherified melamine-formaldehyde resin (BASF SE)
Rheovis® PU Rheology modifier (BASF SE)
Acronal® 290D Acrylate dispersion (BASF SE)
Bayferrox® 3910 Iron oxide pigment (LANXESS AG)
Pluriol® P900 Polypropylene glycol (BASF SE)
Cinilex® DPP Red Red pigment (CINIC CHEMICALS)
Titan Rutile 2310 Titanium dioxide (Kronos Titan GmbH)
Duraphos® BAP Butyl phosphate (Solvay)
Baysolvex® D2EHPA Di(2-ethylhexyl)phosphoric acid (LANXESS AG)
Phenyl Acid Phosphate® Mixture of monophenyl phosphate and diphenyl phosphate (IsleChem, LLC)
Isopar® L Isoparaffic hydrocarbon (ExxonMobil)
Byk-347® Silicone surfactant (BYK Chemie GmbH)
Tinuvin® 384-2 Light stabilizer (BASF SE)
Tinuvin 123 Light stabilizer (BASF SE)
Paliogen® Blue L 6482 Blue pigment (BASF SE)

What is claimed is:

1. A method for improving adhesion of a basecoat material to an overbaked clearcoat material, the method comprising:
   including a phosphoric acid, a monoester or diester of a phosphoric acid, or both, in an aqueous basecoat material,
   wherein the overbaked clearcoat material comprises a boron compound.

2. The method of claim 1, wherein 0.1 to 5 wt % of the phosphoric acid, the monoester or diester of a phosphoric acid, or both, based on an amount of the aqueous basecoat material, is included in the aqueous basecoat material.

3. The method of claim 2, wherein 0.3 to 1.5 wt % of the phosphoric acid, the monoester or diester of a phosphoric acid, or both, based on the amount of the aqueous basecoat material, is included in the aqueous basecoat material.

4. The method of claim 1, wherein the monoester or diester of a phosphoric acid has the formula I:

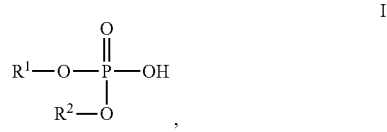

in which $R^1$ and $R^2$ are identical to or different from one another and are selected from the group consisting of substituted or unsubstituted alkyl having 1 to 20 carbon atoms, cycloalkyl having 3 to 20 carbon atoms, and aryl having 6 to 20 carbon atoms, substituted or unsubstituted alkylaryl, arylalkyl, alkylcycloalkyl, cycloalkylalkyl, arylcycloalkyl, cycloalkylaryl, alkylcycloalkylaryl, alkylarylcycloalkyl, arylcycloalkylalkyl, arylalkylcycloalkyl, cycloalkylalkylaryl, and cycloalkylarylalkyl, the alkyl, cycloalkyl, and aryl groups present therein containing in each case the above-stated number of carbon atoms, and
$R^1$ or $R^2$ being hydrogen in the monoester of a phosphoric acid.

5. The method of claim 1, wherein the monoester or diester of a phosphoric acid is a monophenyl or diphenyl phosphate, a monobutyl or dibutyl phosphate, or a mixture of two or more of a monophenyl or diphenyl phosphate and a monobutyl or dibutyl phosphate.

6. The method of claim 1, wherein the basecoat material is free from an effect pigment.

7. The method of claim 6, wherein the effect pigment is an aluminum effect pigment.

* * * * *

UNITED STATES PATENT AND TRADEMARK OFFICE
CERTIFICATE OF CORRECTION

PATENT NO.         : 10,221,324 B2
APPLICATION NO.    : 15/548799
DATED              : March 5, 2019
INVENTOR(S)        : Bernhard Steinmetz et al.

It is certified that error appears in the above-identified patent and that said Letters Patent is hereby corrected as shown below:

In the Specification

Column 5, Line 21, delete "under A))," and insert -- under A), --, therefor.

Column 5, Line 44, delete "(IlseChem, LLC)" and insert -- (IsleChem, LLC) --, therefor.

Signed and Sealed this
Twenty-ninth Day of October, 2019

Andrei Iancu
*Director of the United States Patent and Trademark Office*